Nov. 27, 1951     G. R. FEASTER     2,576,109

SPARK PLUG AND IGNITION SYSTEM TESTER

Filed Oct. 29, 1948

Inventor

Guy R. Feaster

By *Clarence A. O'Brien and Harvey B. Jacobson*

Attorneys

Patented Nov. 27, 1951

2,576,109

UNITED STATES PATENT OFFICE 2,576,109

SPARK PLUG AND IGNITION SYSTEM TESTER

Guy R. Feaster, Manhattan, Calif.

Application October 29, 1948, Serial No. 57,231

2 Claims. (Cl. 175—183)

This invention relates to spark plug and ignition testers of the type using a discharge tube held by the operator and applied on the terminal of the system under test, for instance on the high potential terminal of the spark plug, said discharge tube indicating by a glow the presence of a high potential.

Indicators of this type, such as customarily used, have the disadvantage that, while they indicate correctly the fact that the system is in working order, they do not indicate whether sparks are actually passing the gap of the spark plug in the cylinder. Failures which are not due to faults occurring in the system, but are due to conditions in the cylinder are therefore not indicated with this type of spark plug tester.

Notwithstanding this disadvantage, instruments of this type are used on account of their simplicity and inexpensiveness.

It is the object of the present invention to improve instruments of this type without changing their fundamental characteristics in such a way that an indication of those conditions in the cylinder which affect the passage of sparks through the gap of the spark plug may be given.

It is a further object of this invention to provide an instrument with double indicator means, the combined indication of said means revealing defects, faults, or fouling in the ignition system or in the cylinder of the engine.

It is a further object of the invention to provide double indicating means capable of indicating three different conditions of the system, including the spark plugs, one of said indications relating to the perfect condition of the entire system including the spark plugs, a further indication pointing to a defect or fault within the ignition system and a third indication being indicative of faults affectng solely the gap of the spark plug.

It is a further object of the invention to provide two indicator means acting conjointly and substantially in series with each other which indicator means are moreover operable within a circuit or system which in its turn is parallel to the spark plug, said means being capable of giving an approximate quantitative indication, discriminating between the faulty or otherwise partly or wholly inoperative condition of the spark plug and between a perfect working condition of the same.

It is a further object of the invention to provide a quantitative indication of the current passing the discharge tube by means of a galvanometer or other current indicating or registering instrument.

It is a further object of the invention to provide an indicator instrument which operates in parallel to the gap of the spark plug in such a manner that an increase of the rate of flow of current through the indicator instrument exceeding a certain limit is indicative of an irregularity of the gap of the spark plug due to a failure of the gap of the spark plug to pass sparks.

It is a further object of the invention to so arrange a galvanometer or other indicating instrument that it registers or indicates the fact that the current passing through said instrument exceeds a certain value, said instrument being moreover so connected with the indicating discharge tube that a diverting of a current of higher value through the tube and the instrument shows that conditions in the parallel branch containing the spark plugs have become abnormal.

Further objects of the invention are of a more specific nature and will be mentioned in the following detailed specification.

The invention is illustrated in the accompanying drawing showing one embodiment thereof. It is however to be understood that this embodiment is shown by way of example in order to permit the explanation of the principle of the invention and the best mode of applying said principle. The invention is described as an application of this principle and further modifications and embodiments will therefore be foreshadowed to the expert skilled in this art. Modifications of the example shown are therefore not necessarily departures from the principle of the invention.

Figure 2:
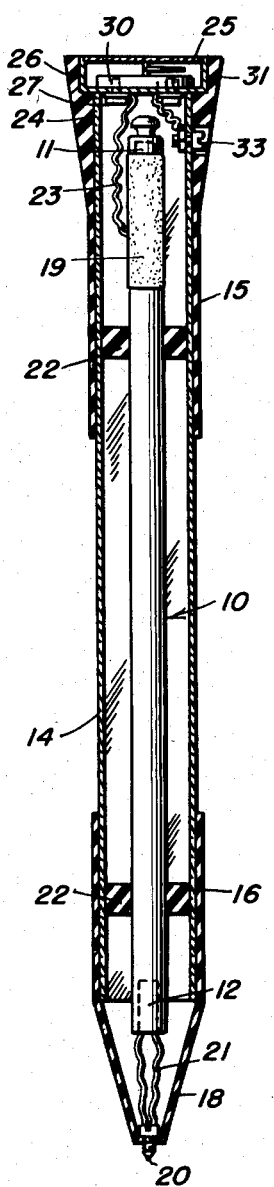
Figure 2 is an elevational sectional view of the testing instrument a section being taken along any plane passing through the axis of symmetry.
Figure 1:
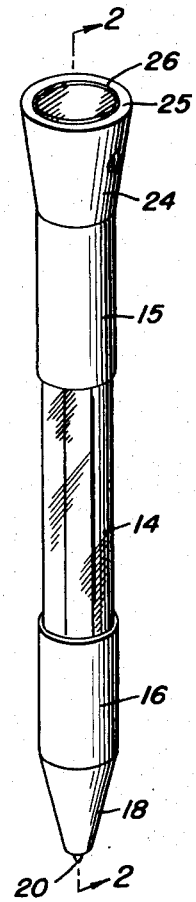
Figure 1 is a perspective view of the instrument.

The tester, as above explained, includes a discharge tube 10 of a small or restricted cross section, preferably a neon filled tube which glows upon passage of a high tension current, such as produced by an ignition coil. The cross section of the tube is sufficiently small or is so restricted that a red glow may be observed as soon as ionization takes place. The tube is provided with the customary two electrodes 11, 12, at its ends.

At one of its ends, this being shown as the upper end in the figures, the discharge tube is surrounded by a metal foil or by a layer of metallic paint 19 which is arranged close to the electrode 11. A contact spring or contact strip 23 is soldered or otherwise electrically connected to said metal foil or metal layer and the said strip or spring is further connected to a contact screw 27 of a galvanometer 30 which is held within the cap 15 forming part of the holder and projects outwardly.

The tube is held within a transparent tube 14 made of a transparent plastic or of glass on the ends of which opaque plastic or rubber caps 15, 16 are attached. The transparent tube 14 with the two caps 15 and 16 attached to it forms a holder of the discharge tube. The said tube may be observed on a stretch left between the two opaque caps which should contain the most restricted portion of the neon tube, if the latter should be provided with a varying cross section in order to produce a vivid glow.

The rubber or plastic cap 16 is provided with a tapering conical portion 18 through which a contact screw 20 passes, the tip of which projects outwardly. This contact screw 20 is connected with electrode 12 by means of the wires 21 which have therefore to pass through the end of the glass tube.

In order to hold the neon tube which is of small diameter within the transparent plastic or glass tube 14 rubber or sponge washers 22 may be used.

The cap 15 of opaque material on the other end of tube 14 is partly cylindrical and partly conical the base of the cone with the largest diameter being arranged at the end. The said conical portion 24 is provided at its base 25 with a recess 26 which accommodates a small galvanometer 30. The galvanometer may be of the usual type, but may be much simplified, as its indications are only supposed to indicate currents above a certain value. The galvanometer may be enclosed in a small box 31 having a cover of glass or plastic, the box fitting into the recess 26.

The galvanometer coil is connected with the metal foil or layer 19 of the discharge tube by means of the wires 23 passing through the tube to the outside. It is moreover connected with screw 33.

The galvanometer needle or pointer is observable through the transparent cover of box 31 at the end of the testing instrument.

Figure 4:
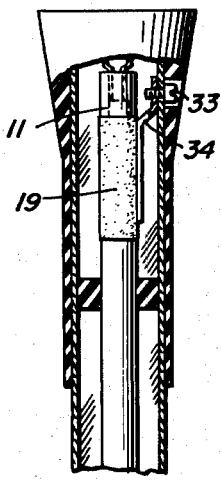
Figure 4 is an elevational sectional view of a modification of the testing instrument.
Figure 3:
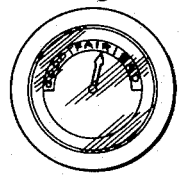
Figure 3 is an end view of the instrument.

In the simplified modification shown in Figure 4, the galvanometer is dispensed with the testing means being the intensity of the electric shock which the operator feels when touching screw 33. In this modification therefore the metal foil or layer 19 is directly connected with screw 33 by means of conductor 34.

In order to test a spark plug the operator sets the tip 20 of the screw projecting from cap 16 on the spark plug terminal while the engine is running, holding the upper portion of the tester in his hand and observing the galvanometer needle or pointer. If the spark plug is operating correctly the high A. C. potential will produce sufficient ionization in the neon tube to make it glow. The current which passes the tube is transmitted through the layer or foil 19 by induction and through the capacity of the body of the operator to ground. The currents which pass the tube are very small and the galvanometer will not show any deflection.

If the system tested is not in working order for instance if a wire has become disconnected or is broken the tube does not light, thus indicating that the fault lies with the distribution system.

If the system is in working order and the spark does not fire, for instance because oil has been thrown on the electrodes or because a carbon deposit has formed thereon, the current passing through the neon tube is of a much higher value than in the first case. The tube therefore glows and the galvanometer needle or pointer shows a marked deflection.

In the modification shown in Figure 4 the operator touches screw 33. The operator feels immediately by the intensity of the shock received in which condition the spark plug is at the moment. If the spark plug works perfectly a shock will not be felt or it will be insignificant. If the spark plug does not work, the shock will have the maximum intensity. Therefore an experienced operator may be able to get complete information on the firing condition of the plug by paying attention to the way in which he "feels" the shock.

It is thus possible to discriminate between at least three different conditions prevailing in the system including the spark plugs and to locate any fault which may occur speedily.

It will be obvious that changes of unessential details will not affect the invention as described and as claimed in the annexed claims.

Having described the invention, what is claimed as new is:

1. An ignition and spark plug testing implement for fault detecting by an operator holding said implement, comprising an elongated, pencil shaped, insulating and partly transparent casing forming the holder and provided with a pointed probing cap and a gripping cap on its two ends respectively, a probing pin in the probing cap and a body contact on the said gripping cap for producing contact with the operator's hand and body during use of the instrument, a single circuit running from the probing contact to the body contact, said circuit including a current reducing glow discharge tube, provided with two inner electrodes, one of said electrodes being connected with the probing pin and the other being unconnected, an outer electrode formed by a metal layer surrounding the tube and the unconnected inner electrode and insulated therefrom, said outer electrode being connected with the body contact, a galvanometer arranged in said single circuit and having its dial and pointer exposed at one end of the casing, said galvanometer being inserted between the outer electrode of the glow discharge tube and the body contact on the gripping cap of the holder.

2. An ignition and spark plug testing implement for fault detecting by an operator holding said implement, comprising an insulating, pencil shaped, partly transparent casing forming the holder and provided with a pointed cap and with a gripping cap having a flat end provided with a recess, an outwardly projecting contact tip in the pointed cap, an outer body contact in the side portion of the gripping cap, adapted to be brought into contact with the body of the operator gripping the cap, a single circuit running from the probing contact to the body contact, a gaseous glow discharge tube, connected with and forming part of said single circuit, with two inner electrodes, one of said electrodes being connected with the contact tip, the other being unconnected and being surrounded by a metallic layer on the outside of the glow discharge tube, said outside layer being insulated from the inner electrode, and connecting the glow discharge tube with the said single circuit, a connection between said outside electrode of the glow discharge tube and the outer body contact on the gripping cap, and a galvanometer in said connection arranged at right angle to the axis of the holder in the recess, with a dial and a pointer exposed to view with the flat end of the gripping cap.

GUY R. FEASTER.

REFERENCES CITED

The following references are of record in the file of this patent:

UNITED STATES PATENTS

| Number | Name | Date |
|---|---|---|
| 1,991,451 | Elderkin | Feb. 19, 1935 |
| 2,001,382 | Faltico | May 14, 1935 |
| 2,004,365 | Bidwell | June 11, 1935 |
| 2,213,973 | Woodring | Sept. 10, 1940 |
| 2,290,760 | Mehaffie | July 21, 1942 |